(12) United States Patent
Holland et al.

(10) Patent No.: US 10,583,715 B2
(45) Date of Patent: Mar. 10, 2020

(54) VEHICLE DOOR COVER DEVICES AND METHODS OF USING

(71) Applicant: Toyota Motor Engineering & Manufacturing North America, Inc., Plano, TX (US)

(72) Inventors: Lloyd R. Holland, Georgetown, KY (US); Michael P. Meyer, Georgetown, KY (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 47 days.

(21) Appl. No.: 15/963,797

(22) Filed: Apr. 26, 2018

(65) Prior Publication Data

US 2019/0329634 A1 Oct. 31, 2019

(51) Int. Cl.
*B60J 5/04* (2006.01)
(52) U.S. Cl.
CPC ........... *B60J 5/0455* (2013.01); *B60J 5/0402* (2013.01)
(58) Field of Classification Search
CPC ........... B60J 5/04; B60J 5/0402; B60J 5/0463
USPC ............ 296/146.2, 146.6, 152; 49/502
See application file for complete search history.

(56) References Cited

U.S. PATENT DOCUMENTS

| | | | |
|---|---|---|---|
| 5,524,388 A * | 6/1996 | Chowdhury | B60J 1/17 49/374 |
| 6,416,113 B1 * | 7/2002 | Page | B60J 5/0402 296/146.1 |
| 8,424,953 B2 * | 4/2013 | Kawano | B60R 13/04 296/146.5 |
| 9,114,693 B2 * | 8/2015 | Prater | B60J 10/88 |
| 9,114,765 B1 * | 8/2015 | James | B60R 13/04 |
| 2002/0108313 A1 * | 8/2002 | Nozaki | B60J 5/0402 49/441 |
| 2004/0109984 A1 | 6/2004 | Bouic | |
| 2004/0221512 A1 * | 11/2004 | Hoffman | B60J 5/0402 49/440 |
| 2008/0118656 A1 | 5/2008 | Douglas et al. | |
| 2013/0061530 A1 * | 3/2013 | Grudzinski | E05F 11/382 49/406 |
| 2014/0049977 A1 * | 2/2014 | Gold | B60J 5/0402 362/549 |
| 2015/0034006 A1 | 2/2015 | Chan et al. | |
| 2018/0257461 A1 * | 9/2018 | Horneck | B60J 5/0402 |
| 2018/0339576 A1 * | 11/2018 | Heppner | B60J 1/17 |

FOREIGN PATENT DOCUMENTS

DE 102013104873 A1 11/2014
FR 2811623 A1 1/2002

* cited by examiner

*Primary Examiner* — Gregory A Blankenship
(74) *Attorney, Agent, or Firm* — Dinsmore & Shohl LLP

(57) ABSTRACT

A vehicle door cover device for inhibiting contact between an upper frame portion of a door frame of a vehicle door assembly and a glass pane during installation of the glass pane into the vehicle door assembly includes a first sidewall, a second sidewall, and a channel wall that extends between the first sidewall and the second sidewall. The first sidewall, the second sidewall, and the channel wall form a pillar receiving channel that extends between the first sidewall and the second sidewall, and the pillar receiving channel comprises a width dimension and a length dimension and the width dimension is sized to slidably receive the upper frame portion of the door frame during installation of the glass pane.

19 Claims, 4 Drawing Sheets

VEHICLE DOOR COVER DEVICES AND METHODS OF USING

TECHNICAL FIELD

The present specification generally relates to an apparatus and method for installing a window into a vehicle door during vehicle assembly and, more specifically, to a vehicle door cover device and methods of using the same when installing a window into a vehicle door during vehicle assembly.

BACKGROUND

Vehicles may include one or more vehicle doors. The vehicle doors may include windows that slide up and down within the door. The window is installed into the door during manufacture of the vehicle. During installation, the window and/or installer may contact one or more portions of the vehicle door. This contact may be undesirable. It may be possible to inhibit contact between the window and/or installer and the vehicle door using a tape that can be removed and discarded. A vehicle door cover device and methods of using the same when installing a window into a vehicle door may be desired.

SUMMARY

In one embodiment, a vehicle door cover device for inhibiting contact between an upper frame portion of a door frame of a vehicle door assembly and a glass pane during installation of the glass pane into the vehicle door assembly includes a first sidewall, a second sidewall, and a channel wall that extends between the first sidewall and the second sidewall. The first sidewall, the second sidewall, and the channel wall form a pillar receiving channel that extends between the first sidewall and the second sidewall, and the pillar receiving channel comprises a width dimension and a length dimension and the width dimension is sized to slidably receive the upper frame portion of the door frame during installation of the glass pane.

In another embodiment, a method of inhibiting contact between a glass pane and a vehicle door assembly during installation of the glass pane between a door inner panel and a door outer panel of the vehicle door assembly includes installing a vehicle door cover device that comprises a first sidewall, a second sidewall, and a channel wall over an upper frame portion of the vehicle door assembly such that the vehicle door cover device is between the glass pane and the vehicle door assembly during installation of the glass pane between the door inner panel and the door outer panel. The method further includes installing the glass pane between the door inner panel and the door outer panel.

In yet another embodiment, a method of installing a glass pane in a vehicle door assembly includes positioning a vehicle door cover device that comprises a first sidewall, a second sidewall, and a channel wall between a rear end of a gap between a door inner panel and a door outer panel and a door frame b-pillar portion of the vehicle door assembly such that the channel wall contacts a vehicle-forward-facing surface of the door frame b-pillar portion, installing the glass pane between the door inner panel and the door outer panel, and lowering the glass pane into an installed position.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Vehicles may include one or more vehicle doors. The vehicle doors may include windows that slide up and down within the door. The window may be installed into the door during manufacture of the vehicle. The window may be installed between one or more panels of the door and one or more structures that form a border of the door. For example, in the case of a right front vehicle door, the window may be installed between a door inner panel and a door outer panel and between an a-pillar and a b-pillar.

The glass pane that forms the window may be sized and shaped to substantially enclose the cabin of the vehicle when the window is shut. That is, the glass pane may be sized and shaped such that it contacts one or more surfaces of the door inner panel, the door outer panel, the a-pillar, and/or the b-pillar. Because the window closes the cabin of the vehicle when the window is shut, the tolerances between the window and the surfaces surrounding the window that form the door may be small. Hence, during installation, it may be difficult to install the glass pane without contacting one or more surfaces of the vehicle door.

Contact between the glass pane and/or window installer and one or more surfaces of the vehicle door may undesirably affect the window, the surfaces of the door, or both. For example, contact between the window and the vehicle door may scratch or otherwise alter paint that has been applied on surfaces of the vehicle door, may scratch or otherwise alter surfaces of the window and/or the vehicle door.

To avoid such contact between the window and the vehicle door, one or more surfaces may be placed between the window and the vehicle door. The surface may comprise a softer, more durable material than either or both of the glass pane and the vehicle door. For example, the surface may comprise a soft material such as rubber or plastic, whereas the window and the vehicle door may comprise glass and a metal, such as steel or aluminum. Accordingly, a vehicle door cover device and methods of using the same may inhibit unintended contact between the window and vehicle door.

Figure 1:
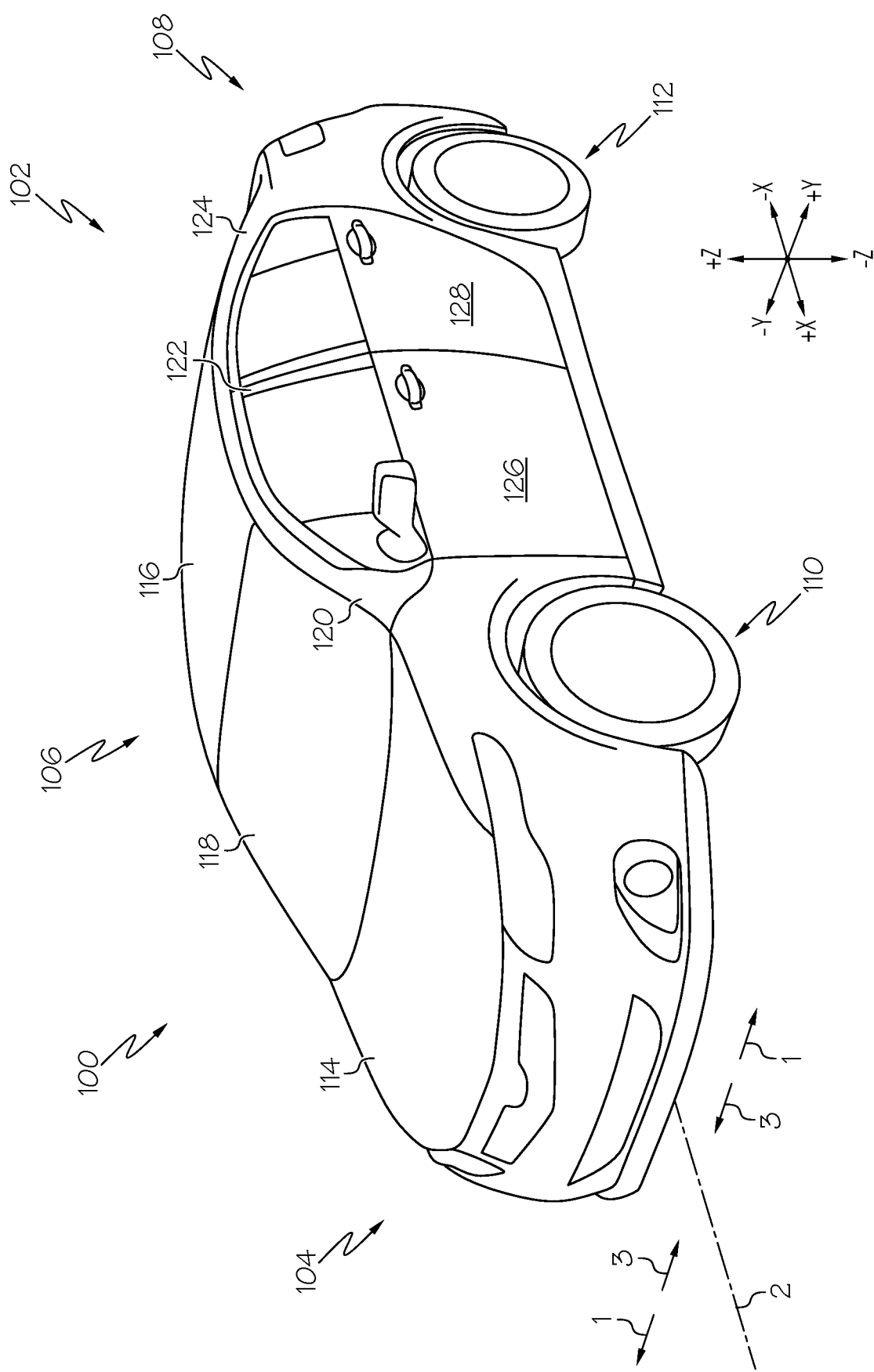
FIG. 1 depicts vehicle including a vehicle door that includes a door frame and a door window, the window spanning between an a-pillar portion and a b-pillar portion of the door frame, according to one or more embodiments shown and described herein.

As used herein, the term "vehicle longitudinal direction" refers to the forward-rearward direction of the vehicle (i.e., in the +/− vehicle X-direction as depicted in FIG. 1). The term "vehicle lateral direction" refers to the cross-vehicle direction of the vehicle (i.e., in the +/− vehicle Y-direction as depicted in FIG. 1), and is transverse to the vehicle longitudinal direction. The term "vehicle vertical direction" refers to the upward-downward direction of the vehicle (i.e., in the +/− vehicle Z-direction as depicted in FIG. 1).

Further, the terms "inboard" and "outboard" are used to describe the relative positioning of various components of the vehicle. The term "outboard" as used herein refers to the relative location of a component in direction 1 with respect to a vehicle centerline 2. The term "inboard" as used herein refers to the relative location of a component in direction 3 with respect to the vehicle centerline 2. Because a vehicle, such as the vehicle 100 depicted in FIG. 1, may be generally symmetrical about the vehicle centerline 2, the terms "inboard" and "outboard" may be switched when evaluating components positioned along opposite sides of the vehicle 100. Further, while certain components of the vehicle 100 are described as extending in one of the identified directions or oriented toward one of the identified directions, it should be understood that these components extend or are oriented in at least these recited directions.

Vehicles that incorporate elements according to the present disclosure may include a variety of construction methodologies that are conventionally known, including the unibody construction methodology as depicted, as well as a body-on-frame construction methodology. While the embodiments of the present disclosure are described and depicted herein in reference to unibody structures, it should be understood that vehicles that are constructed with body-on-frame construction may incorporate the elements that are shown and described herein.

Referring to FIG. 1, the vehicle 100 is depicted. The vehicle 100 includes a body 102 that includes a forward section 104, a cabin section 106, and a rear section 108. The forward section 104, the cabin section 106, and the rear section 108 may be integral with the body 102. The cabin section 106 generally defines a passenger cabin of the vehicle 100. The body 102 may also include a front suspension and a rear suspension. The front suspension and the rear suspension may include various components that connect a front wheel 110 and a rear wheel 112 to the body 102. The forward section 104 may include a hood 114. The hood 114 may generally cover an engine compartment of the vehicle 100. The cabin section 106 may include a roof 116. The roof 116 may span in the vehicle longitudinal and vehicle lateral directions to cover the cabin section 106 of the vehicle 100. A windshield 118 may generally span between the hood 114 and the roof 116. The windshield 118 may serve as a forward boundary of the cabin section 106.

The body 102 may include an a-pillar 120, a b-pillar 122, and a c-pillar 124 that extend upward in the vehicle vertical direction. The a-pillar 120 is positioned forward of the b-pillar 122 and the b-pillar 122 is positioned forward of the c-pillar 124. Other bodies may include additional pillars, such as a d-pillar and e-pillar. As used herein the terms "forward pillar assembly" and "rearward pillar assembly" are used to refer to the relative location of the a-pillar 120, b-pillar 122, and the c-pillar 124 with respect to one another. For example, in one embodiment, the a-pillar 120 is a forward pillar assembly and the b-pillar 122 is a rearward pillar assembly that is positioned rearward of the forward pillar assembly in the vehicle longitudinal direction. In embodiments, the b-pillar 122 can be the forward pillar assembly and the c-pillar 124 can be the rearward pillar assembly that is positioned rearward of the forward pillar assembly in the vehicle longitudinal direction.

The vehicle 100 may include one or more vehicle door assemblies coupled to the body 102 of the vehicle 100. A front door assembly 126 may be coupled to the a-pillar 120 and a rear door assembly 128 may be coupled to the b-pillar 122. In some embodiments, the front door assembly 126 may be hingedly coupled to the a-pillar 120 and the rear door assembly 128 may be hingedly coupled to the b-pillar 122. In other embodiments, the rear door assembly 128 may be severally coupled to the b-pillar 122, such as when the rear door assembly 128 is sliding door or when the rear door assembly 128 is hingedly coupled to the c-pillar 124 (i.e., a rear-hinged door). The front door assembly 126 and the rear door assembly 128 may facilitate ingress and egress to the cabin section 106 of the vehicle 100.

Figure 2:
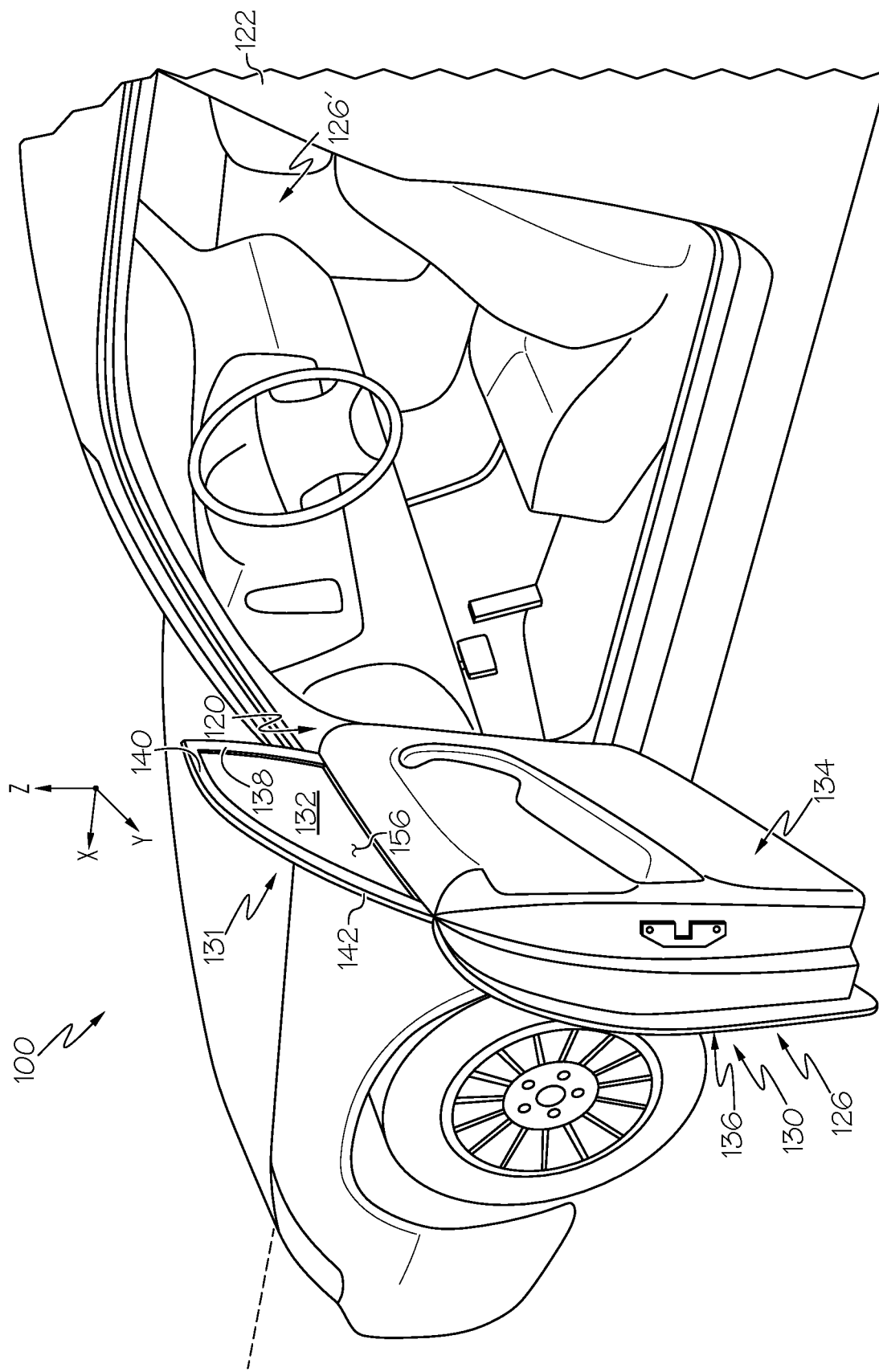
FIG. 2 depicts the vehicle door of the vehicle of FIG. 1 in an open position and attached to the vehicle at an a-pillar of the vehicle, according to one or more embodiments shown and described herein.
Figure 3:
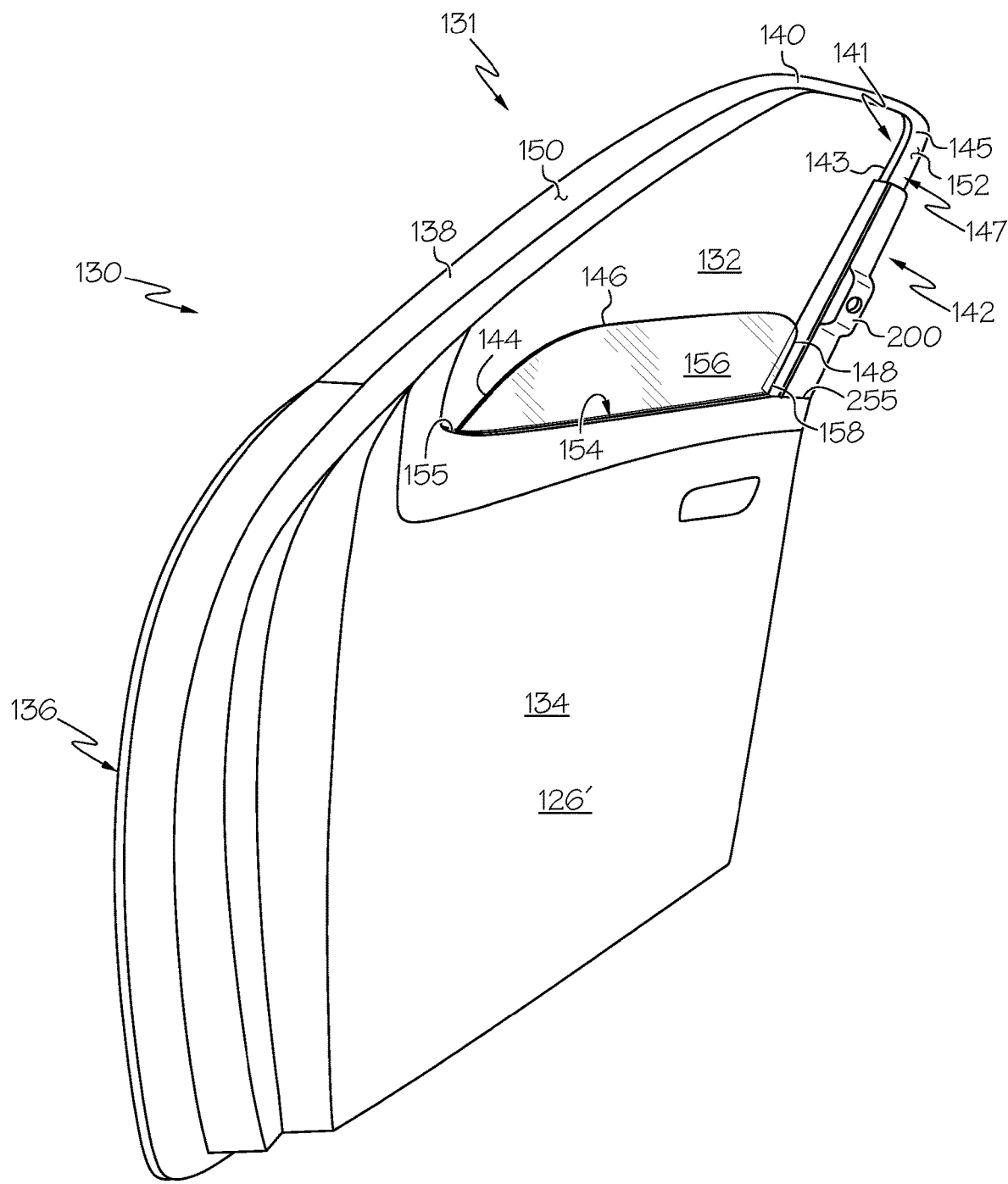
FIG. 3 depicts a right-front side vehicle door for the vehicle of FIG. 1 including a glass pane installed between a door inner panel and a door outer panel and a vehicle door cover device in an installed position along a b-pillar portion of the vehicle door, according to one or more embodiments shown and described herein.

Referring now to FIG. 2, the front door assembly 126 is shown connected to the vehicle 100 at the a-pillar 120. The front door assembly 126 includes a door frame 130, a front door window 132, a door inner panel 134, and a door outer panel 136. The front door window 132 may comprise a glass pane 156 as described in greater detail herein. The door frame 130 may include an upper frame portion 131 that includes a door frame a-pillar portion 138, a door frame top portion 140, and a door frame b-pillar portion 142. The front door window 132 may include one or more edges that correspond to the various portions of the door frame 130. Referring briefly to FIG. 3, a front edge 144 of the glass pane 156 may correspond to the door frame a-pillar portion 138, a top edge 146 of the glass pane 156 may correspond to the door frame top portion 140, and a rear edge 148 of the glass pane 156 may correspond to the door frame b-pillar portion 142. A bottom edge of the front door window 132 may be installed between the door inner panel 134 and the door outer panel 136. Referring back to FIG. 2, the front door window 132 may slide up and down inside the front door assembly 126 between the door inner panel 134 and the door outer panel 136. In some embodiments, the front door assembly 126 is installed at a driver side of the vehicle 100 and a front door assembly 126', that substantially mirrors the front door assembly 126, is installed on a passenger side of the vehicle 100.

During assembly of the vehicle 100, various functions of the assembly process (e.g., painting) may be carried out at particular points in the assembly process and various pieces and parts (e.g., the front door assembly 126) of the vehicle 100 may be assembled on the vehicle 100 at particular points in the assembly process. In the example embodiment depicted in FIGS. 1 and 2, components of the front door assembly 126, such as the door outer panel 136 or the door frame b-pillar portion 142, may be painted before the glass pane 156 is installed. Processes may be implemented to reduce the possibility that the paint on the door outer panel 136 of the front door assembly 126 is chipped or nicked during the assembly process, especially during installation of the glass pane 156.

FIG. 3 shows the front door assembly 126' from the inside of the front door assembly 126' with the glass pane 156 in an installed position. The upper frame portion 131 extends upward from the door outer panel 136 in the vehicle vertical direction. The door frame b-pillar portion 142 includes a vehicle-exterior-facing surface 141, a vehicle-forward-facing surface 143, a vehicle-interior-facing surface 145, and a vehicle-rear-facing surface 147. In the particular embodiment shown in FIG. 3, the glass pane 156 has been installed between the door outer panel 136 and the door inner panel 134. One or more layers of paint 150 may cover one or more portions of the front door assembly 126'. For example, one or more of the vehicle-exterior-facing surface 141, the vehicle-forward-facing surface 143, and the vehicle-interior-facing surface 145 of the door frame b-pillar portion 142 may be painted. Additionally, one or more layers of adhesive tape 152 may cover the layers of paint 150 that cover the door frame b-pillar portion 142 or other surfaces of the front door assembly 126'.

To install the glass pane 156, the glass pane 156 may be slid into place between the door outer panel 136 and the door inner panel 134. The glass pane 156 may be slid in the vehicle downward direction into a gap 154 between the door outer panel 136 and the door inner panel 134. The gap 154 may extend from a rear end 158 at the door frame b-pillar portion 142 to a front end 155 at the door frame a-pillar portion 138 in the vehicle longitudinal direction. The bottom edge of the glass pane 156 may be inserted into the gap 154 and the glass pane 156 may be lowered into place between the door outer panel 136 and the door inner panel 134.

During installation of the glass pane 156, it may be possible for the rear edge 148, the bottom edge, or other portions of the glass pane 156 to contact one or more components of the upper frame portion 131, the door inner panel 134, the door outer panel 136, and/or one or more other portions of the front door assembly 126'. The components of the upper frame portion 131 may be scratched or nicked if they are contacted by the glass pane 156 during installation. For example, the vehicle-forward-facing surface 143 of the door frame b-pillar portion 142 may be nicked or scratched by the rear edge 148 of the front door window 132 during installation. Additionally, the door frame b-pillar portion 142 may be a location where a window installer tends to manually grasp the front door assembly 126' during a window installation process. Because the vehicle-forward-facing surface 143 and other surfaces of the front door assembly 126' may be covered by layers of paint 150 or adhesive tape 152, it may be undesirable for them to be nicked or scratched.

Moreover, such contact may scratch or nick the glass pane 156. This may result in undesirable alterations to the glass pane 156, affect its function or aesthetic appearance, result in degraded capacity, or some combination of the above. Accordingly, some device and/or method for inhibiting contact between the components of the front door assembly 126' and the front door window 132 during installation of the front door window 132 may be desired.

Figure 4:
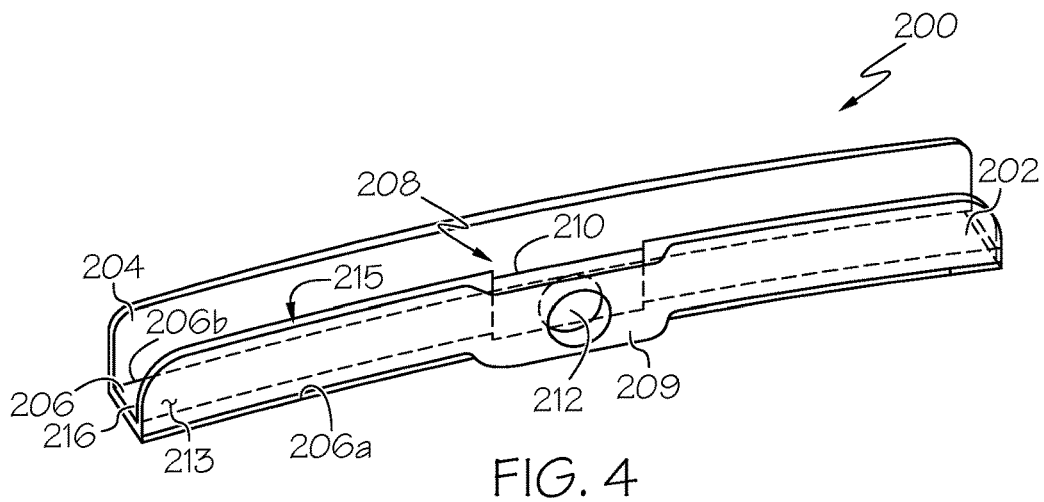
FIG. 4 depicts the vehicle door cover device of FIG. 3 in an isolated, isometric view, according to one or more embodiments shown and described herein.
Figure 5:
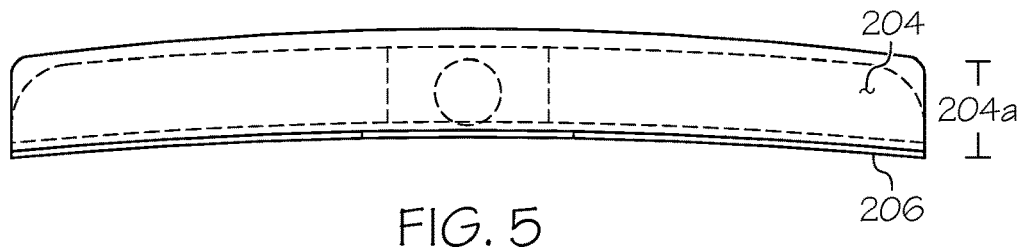
FIG. 5 depicts a rear (second side wall) view of the vehicle door cover device of FIG. 4, according to one or more embodiments shown and described herein.

Referring now to FIGS. 4-8, the vehicle door cover device 200 will be described in greater detail. FIG. 4 shows an isometric view of the vehicle door cover device 200 in isolation. The vehicle door cover device 200 includes a first sidewall 202 and a second sidewall 204 that extend from a channel wall 206. In some embodiments, the first sidewall 202 and the second sidewall 204 may extend from opposite sides 206a and 206b of the channel wall 206 such that they form a pillar receiving channel 208. The pillar receiving channel 208 may receive one or more portions of the door frame 130 of FIG. 3 such that the first sidewall 202, the second sidewall 204, and the channel wall 206 cover one or more portions of the door frame 130 during installation of the glass pane 156 in the front door window 132 in order to inhibit contact between the glass pane 156 and the door frame 130 as will be described in greater detail herein.

The first sidewall 202 and the second sidewall 204 may extend from the opposite sides 206a and 206b of the channel wall 206 such that they are substantially parallel with one another along a height 202a (FIG. 7) of the first sidewall 202 and a height 204a (FIG. 5) of the second sidewall 204. Briefly referring to FIG. 6, in embodiments in which the first sidewall 202 and the second sidewall 204 are substantially parallel, a width 221 of the pillar receiving channel 208 may be constant along the height 202a of the first sidewall 202 and the height 204a of the second sidewall 204.

Because the vehicle door cover device 200 may be formed from a relatively soft and/or relatively pliable material, such as, for example, rubber, high density plastic, or nylon, the width 221 of the pillar receiving channel 208 between the first sidewall 202 and the second sidewall 204 may expand as the vehicle door cover device 200 is placed on the door frame b-pillar portion 142 of the front door assembly 126', as shown in the example embodiment depicted in FIG. 3. In some embodiments, the first sidewall 202 and the second sidewall 204 may form a friction fit with the door frame b-pillar portion 142 of the front door assembly 126'. That is, the width of the door frame b-pillar portion 142, or some other portion of the front door assembly 126' on which the vehicle door cover device 200 may be placed, may be greater than the width 221 of the pillar receiving channel 208. The first sidewall 202 and the second sidewall 204 may slightly bend to fit over the door frame b-pillar portion 142 or other portion such that the internal tensile forces in the first sidewall 202 and the second sidewall 204 hold the vehicle door cover device 200 in place along the height of the door frame b-pillar portion 142 or other portion of the front door assembly 126'.

In some embodiments, the first sidewall 202 and the second sidewall 204 may extend from the channel wall 206 and away from or toward one another, forming a pillar receiving channel 208 that may vary in width. In some embodiments, one or both of the first sidewall 202 and the second sidewall 204 extend perpendicularly from the channel wall 206. In some embodiments, either or both of the first sidewall 202 and the second sidewall 204 may extend from the channel wall 206 at an angle that is not perpendicular.

Referring again to FIG. 4, the first sidewall 202 may include a raised portion 209. In some embodiments, the first sidewall 202 may also include a notch 210 and a cutout portion 212. While the particular embodiment shown in FIG. 4 shows the cutout portion 212 and the notch 210 in the first sidewall 202 at the same location as the raised portion 209, it is contemplated that the notch 210 and the cutout portion 212 may comprise other portions of the first sidewall 202 besides the raised portion 209. The raised portion 209 and the notch 210 may provide a clearance that may be used to protect the front door assembly 126 of FIG. 3 as will be described in greater detail herein.

Figure 6:
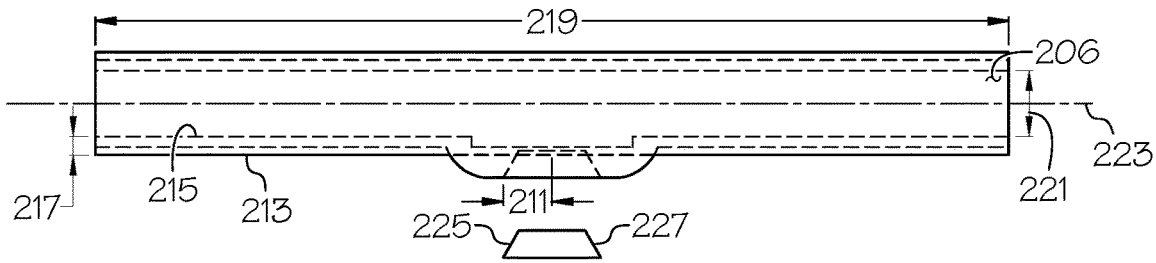
FIG. 6 depicts a bottom view of the vehicle door cover device of FIG. 4, according to one or more embodiments shown and described herein.
Figure 7:
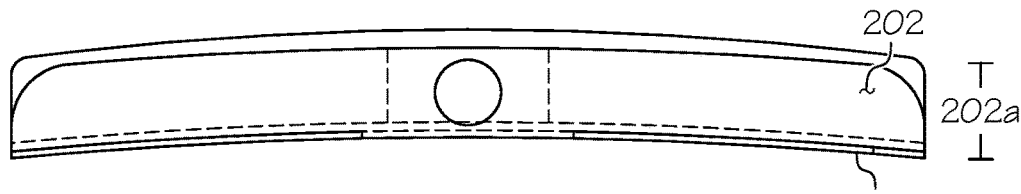
FIG. 7 depicts a front (first side wall) view of the vehicle door cover device of FIG. 4, according to one or more embodiments shown and described herein.
Figure 8:
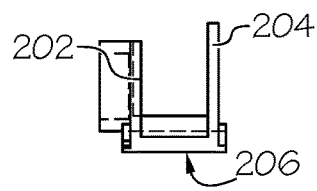
FIG. 8 depicts a side view of the vehicle door cover device of FIG. 4, according to one or more embodiments shown and described herein.

Referring to FIG. 6, in some embodiments, the cutout portion 212 may extend through an entire thickness of the first sidewall 202 as shown in FIG. 6. However, it is contemplated that the cutout portion 212 may only extend through a partial thickness of the first sidewall. For example, the cutout portion 212 may extend a partial depth through the thickness of first sidewall extending inward from an outer surface 213 of the first sidewall 202 or outward from an inner surface 215 of the first sidewall 202. In some embodiments, a dimension 211, such as a radius, of the cutout portion 212 may vary as the cutout portion 212 passes through a thickness 217 of the first sidewall 202 from a center line 223 of the pillar receiving channel 208 to the outside of the first sidewall 202. For example, the dimension 211 of the cutout portion 212 may increase or decrease at a constant rate as the cutout portion 212 passes through the thickness 217 of the first sidewall 202. The particular embodiment shown in FIG. 6 shows the dimension 211 increasing in a direction from the center line 223 outward through the thickness 217 of the first sidewall 202. However, it is contemplated that the dimension 211 may be constant along the thickness 217 of the first sidewall 202.

Still referring to FIG. 6, the cutout portion 212 may form a void that enables the placement of a magnet 225 or other tool within the wall thickness of the vehicle door cover device 200. The magnet 225 or other tool may removably couple the vehicle door cover device 200 to the vehicle door during installation of the glass pane 156 as will be described in greater detail herein. For example, the magnet 225 may magnetically couple the vehicle door cover device 200 to the front door assembly 126 during installation of the glass pane 156 into the front door assembly 126. The magnet 225 may comprise an edge 227 that forms a radial profile of the magnet 225.

The magnet 225 may fit within the cutout portion 212 and hold the vehicle door cover device 200 against the door frame b-pillar portion 142 or another portion of the front door assembly 126 to inhibit the glass pane 156 from touching the door frame 130 while the glass pane 156 is installed into the front door window 132. While the particular embodiment shown in FIGS. 4-8 depicts the cutout portion 212 as a circle, it is contemplated that the cutout portion 212 or several cutout portions could embody a different shape. For example, the cutout portion 212 may be a square, a triangle, or other polygon. In some embodiments, the shape of the cutout portion 212 may correspond to the shape of the magnet 225 or other tool that is placed inside the cutout portion 212. For example, in some embodiments, a circular magnet may be placed within the cutout portion 212.

In some embodiments, a radial profile of the magnet 225 may correspond to the increase or decrease in the dimension 211 of the cutout portion 212. The correspondence between the radial profile of the magnet 225 and the change in dimension 211 of the cutout portion 212 may hold the magnet 225 in place during placement of the vehicle door cover device 200 or may enable easier removal of the magnetic coupling between the magnet 225 and the vehicle door assembly that keeps the vehicle door cover device 200 in place. As shown in FIG. 6, the edge 227 of the magnet 225 comprises a profile that corresponds to the change in dimension 211 of the cutout portion 212. Thus, when the vehicle door cover device 200 is placed on the front door assembly 126' as shown in FIG. 3, the magnet 225 will pull off of the front door assembly 126' when the vehicle door cover device 200 is removed. The portion of the vehicle door cover device 200 that forms the inner wall of the cutout portion 212 will contact the edge 227 of the magnet 225 and pull the magnet 225 off of the front door assembly 126'.

Some embodiments of the vehicle door cover device 200 may include more than one raised portion 209, more than one notch 210, and/or more than one cutout portion 212. Moreover, in some embodiments, the notch 210 and/or the cutout portion 212 may be separate from the raised portion 209 and/or each other. For example, it is possible that other embodiments of the vehicle door cover device 200 may include a cutout portion 212 that is separate from the raised portion 209 and/or the notch 210. Similarly, it is contemplated that a notch 210 may be separate from the raised portion 209.

Referring once again to FIG. 4, the notch 210 may provide a clearance between an inside surface 214 of the first sidewall 202 and the component of the door frame 130 around which the vehicle door cover device 200 is placed. This clearance may reduce the likelihood that metal or other objects that are attracted to the magnet 225 can scrape, nick, or scratch the layers of paint 150 and/or adhesive tape 152 on the front door assembly 126 when the vehicle door cover device 200 is placed on the front door assembly 126. For example, during manufacture and assembly of the front door assembly 126, various pieces of metal or other debris may be formed. When the vehicle door cover device 200 is placed on the door frame b-pillar portion 142 of the door frame 130, metal shavings or other miscellaneous metallic pieces or other debris that is subject to magnetic forces may be attracted to the magnet 225 that may be placed within the cutout portion 212.

When installed on the front door assembly 126, the vehicle door cover device 200 may contact the door frame 130 along the inside surface 216 of the channel wall 206. As best shown in FIG. 6, the channel wall 206 may comprise a slight arcuate shape. The arcuate shape may enable the inside surface 216 to maintain contact with the vehicle-forward-facing surface 143 of the door frame b-pillar portion 142 or some other portion of the door frame b-pillar portion 142.

Still referring to FIG. 6, the pillar receiving channel 208 may comprise a length dimension 219 and the width 221. The pillar receiving channel 208 may be sized to correspond to one or more portions of the door frame b-pillar portion 142 of the door frame 130. That is, the distance between the first sidewall 202 and the second sidewall 204 may be chosen such that the door frame b-pillar portion 142 can fit in between the first sidewall 202 and the second sidewall 204. In some embodiments of the vehicle door cover device 200, the first sidewall 202 and the second sidewall 204 are substantially parallel. In such an embodiment, the widest width of the pillar receiving channel 208 may correspond to the widest width between the vehicle-exterior-facing surface 141 and the vehicle-interior-facing surface 145 of the door frame b-pillar portion 142.

In some embodiments of the vehicle door cover device 200, the vehicle door cover device comprises a flexible material, such as a rubber or flexible plastic material. In such an embodiment, the width between the vehicle-exterior-facing surface 141 and the vehicle-forward-facing surface 143 of the door frame b-pillar portion 142 may be greater than the width between the first sidewall 202 and the second sidewall 204 because the first sidewall 202 and the second sidewall 204 may flex to fit over the door frame b-pillar portion 142 when the vehicle door cover device 200 is positioned over the door frame b-pillar portion 142.

The arcuate shape of the vehicle door cover device 200 may provide for contact between the vehicle door cover device 200 and the door frame 130 along an entire length of the vehicle door cover device 200. For example, the door frame b-pillar portion 142 may be similarly arcuately shaped. In some embodiments, the vehicle door cover device 200 may comprise a pliable material and be relatively flexible, allowing the vehicle door cover device 200 to be shaped into position along a straight portion of the door frame 130.

Referring once again to FIG. 3, the installation of the glass pane 156 using the vehicle door cover device 200 will be described. In some embodiments, the front door assembly 126 may be opened (i.e., pivoted open at the a-pillar 120 such that the rearward portion of the door swings outward in the vehicle lateral direction). In some embodiments, the glass pane 156 may be installed between the door inner panel 134 and the door outer panel 136 before the front door assembly 126 is installed on the vehicle 100. With the rear portion of the front door assembly 126 positioned away from the vehicle 100, an operator may hold the vehicle door cover device 200 above the gap 154 between the door inner panel 134 and the door outer panel 136 such that the inside surface 216 of the channel wall 206 faces the vehicle-forward-facing surface 143 of the door frame b-pillar portion 142.

The vehicle door cover device 200 is then pushed against the door frame b-pillar portion 142 of the front door assembly 126 such that the first sidewall 202 and the second sidewall 204 extend over opposite surfaces of the door frame b-pillar portion 142 and the inside surface 216 is in contact with the vehicle-forward-facing surface 143 of the door frame b-pillar portion 142. The first sidewall 202 may extend over the vehicle-interior-facing surface 145 and the second sidewall 204 may extend over the vehicle-exterior-facing surface 141 as shown in FIG. 3.

In some other embodiments, the first sidewall 202 may be in contact with the vehicle-exterior-facing surface 141 of the door frame b-pillar portion 142 and the second sidewall 204 may be in contact with the vehicle-interior-facing surface 145 of the door frame b-pillar portion 142. In some embodiments, a bottom end 255 of the vehicle door cover device 200 may be approximately 1 to 2 inches above the gap 154 between the door inner panel 134 and the door outer panel 136. In some embodiments, the bottom end 255 may be 0.5 to 2.5 inches above the gap 154 between the door inner panel 134 and the door outer panel 136. In some embodiments, a top end 257 of the vehicle door cover device 200 may be positioned apart from the door frame top portion 140. In some embodiments, the vehicle door cover device 200 may be positioned such that the top end 257 is approximately 1 to 2 inches from the door frame top portion 140. In some embodiments, the top end 257 may be 0.5 to 2.5 inches from the door frame top portion 140. In some embodiments, the vehicle-rear-facing surface 147 may remain exposed during installation of the glass pane 156. In other embodiments, the vehicle-rear-facing surface 147 may be covered during installation of the glass pane 156, for example, in embodiments of the vehicle door cover device 200 having four or more walls. For example, a fourth sidewall, not shown in the drawings, may moveably connect between the free ends of the first sidewall 202 and the second sidewall 204. In such embodiments, the fourth sidewall may be coupled to only one of the first sidewall 202 and the second sidewall 204 such that the fourth sidewall can be moved in order to place the vehicle door cover device 200 over the door frame b-pillar portion 142.

In some embodiments, the height of the vehicle door cover device 200 may be adjusted as the glass pane 156 is installed. That is, during installation of the glass pane, it may be necessary to move the vehicle door cover device 200 in order to protect all surfaces of the door frame b-pillar portion 142 during installation.

Once the vehicle door cover device 200 is installed over the door frame b-pillar portion 142, the glass pane 156 may be installed between the door inner panel 134 and the door outer panel 136. A bottom edge of the glass pane 156 may be slid in the gap 154 between the door inner panel 134 and the door outer panel 136. During installation, the glass pane 156 may be oriented such that a rear edge 148 of the glass pane 156 faces the vehicle-forward-facing surface 143 of the door frame b-pillar portion 142 and the front edge 144 faces the door frame a-pillar portion 138. Once the bottom edge is in the gap 154 with the glass pane 156 correctly oriented, the glass pane 156 may be slid up and down within the gap 154. After manufacture and assembly of the vehicle is complete, the glass pane 156 may be slid up and down within the gap in substantially the same manner.

After the glass pane 156 is installed, the vehicle door cover device 200 may be removed from the door frame b-pillar portion 142 and then reused on another front door assembly 126. In embodiments in which the vehicle door cover device 200 is temporarily coupled to the door frame 130 using a magnet, such as the magnet 225, the user may slide the vehicle door cover device 200 away from the door frame 130 forward to avoid pulling the magnet 225 directly off of the b-pillar portion and having to overcome the full magnetic force of the magnet 225 on the door frame 130.

In some embodiments, the magnet 225 may be removable from the cutout portion 212. In such embodiments, the magnet 225 may be removed from the cutout portion 212 such that the magnetic force acting on any metallic or magnetic scraps within the notch 210 is removed and the scraps can be removed from the notch 210.

It should now be understood that a vehicle door cover device having one or more surfaces may be placed between a glass pane of a window and a vehicle door during installation of the glass pane into the window. The one or more surfaces of the vehicle door cover device may comprise a softer, more durable material than either or both of the glass pane and the vehicle door. For example, the surface may comprise a soft material such as rubber, whereas the window and the vehicle door may comprise glass and a metal, such as steel or aluminum. Accordingly, a vehicle door cover device and methods of using the same may inhibit unintended contact between the window and the vehicle door.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A vehicle door cover device for inhibiting contact between an upper frame portion of a door frame of a vehicle door assembly and a glass pane during installation of the glass pane into the vehicle door assembly, the vehicle door cover device comprising:

a first sidewall, a second sidewall, and a channel wall that extends between the first sidewall and the second sidewall, wherein the first sidewall, the second sidewall, and the channel wall form a pillar receiving channel that extends between the first sidewall and the second sidewall, and the pillar receiving channel comprises a width dimension and a length dimension and the width dimension is sized to slidably receive the upper frame portion of the door frame such that the channel wall contacts a vehicle-forward-facing surface of a door frame b-pillar portion of the door frame during installation of the glass pane.

2. The vehicle door cover device of claim 1, wherein the first sidewall and the second sidewall are substantially transverse to the channel wall.

3. The vehicle door cover device of claim 2, wherein the first sidewall and the second sidewall extend from the channel wall substantially parallel to each other.

4. The vehicle door cover device of claim 3, wherein:
the first sidewall and the second sidewall extend from the channel wall at opposite sides of the channel wall, and
the first sidewall and the second sidewall form a friction fit with the door frame b-pillar portion to hold the vehicle door cover device in place on the door frame b-pillar portion during installation of the glass pane.

5. The vehicle door cover device of claim 1, wherein the channel wall comprises an inside surface that contacts the upper frame portion along at least a portion of the length dimension of the vehicle door cover device.

6. The vehicle door cover device of claim 1, wherein one or more of the first sidewall, the second sidewall, and the channel wall comprise one or more cutout portions.

7. The vehicle door cover device of claim 6, wherein the one or more cutout portions are configured to receive a magnet such that the magnet removably couples the vehicle door cover device to the upper frame portion.

8. The vehicle door cover device of claim 7, wherein each of the one or more cutout portions comprise a dimension and each dimension of the one or more cutout portions is constant through a thickness of the first sidewall.

9. The vehicle door cover device of claim 7, wherein each of the one or more cutout portions comprise a dimension and each dimension of the one or more cutout portions varies through a thickness of the first sidewall.

10. The vehicle door cover device of claim 1, wherein the first sidewall and the second sidewall extend from the channel wall and away from one another, forming the pillar receiving channel that expands in width.

11. A method of inhibiting contact between a glass pane and a vehicle door assembly during installation of the glass pane between a door inner panel and a door outer panel of the vehicle door assembly, the method comprising:

installing a vehicle door cover device that comprises a first sidewall, a second sidewall, and a channel wall over an upper frame portion of the vehicle door assembly such that the channel wall contacts a vehicle-forward-facing surface of a door frame b-pillar portion of the upper frame portion during installation of the glass pane between the door inner panel and the door outer panel, and installing the glass pane between the door inner panel and the door outer panel.

12. The method of inhibiting contact between the glass pane and the vehicle door assembly of claim 11, further comprising installing one or more magnets into one or more cutout portions that are formed in the vehicle door cover device.

13. The method of inhibiting contact between the glass pane and the vehicle door assembly of claim 12, wherein the one or more magnets are placed in the first sidewall of the vehicle door cover device to removably couple the vehicle door cover device to the first sidewall.

14. The method of claim 11, further comprising removing the vehicle door cover device after the glass pane is installed.

15. The method of inhibiting contact between the glass pane and the vehicle door assembly of claim 11, wherein the first sidewall and the second sidewall are substantially transverse to the channel wall.

16. The method of inhibiting contact between the glass pane and the vehicle door assembly of claim 15, wherein the first sidewall and the second sidewall extend from the channel wall substantially parallel to one another.

17. The method of inhibiting contact between the glass pane and the vehicle door assembly of claim 16, wherein the first sidewall and the second sidewall form a friction fit with the upper frame portion.

18. A method of installing a glass pane in a vehicle door assembly, the method comprising:

positioning a vehicle door cover device that comprises a first sidewall, a second sidewall, and a channel wall between a rear end of a gap between a door inner panel and a door outer panel and a door frame b-pillar portion of the vehicle door assembly such that the channel wall contacts a vehicle-forward-facing surface of the door frame b-pillar portion, installing the glass pane between the door inner panel and the door outer panel, and lowering the glass pane into an installed position.

19. The method of installing a glass pane of claim 18, wherein the first sidewall and the second sidewall extend from the channel wall at substantially perpendicular angles and substantially parallel to one another.

* * * * *